(12) United States Patent
Habash

(10) Patent No.: US 9,836,029 B2
(45) Date of Patent: Dec. 5, 2017

(54) ALARM CLOCK HAVING A MOTION SENSOR AND MOBILE DEVICE CONNECTIVITY

(71) Applicant: Abduljalil K. H. Habash, Safat (KW)

(72) Inventor: Abduljalil K. H. Habash, Safat (KW)

( * ) Notice: Subject to any disclaimer, the term of this patent is extended or adjusted under 35 U.S.C. 154(b) by 0 days.

(21) Appl. No.: 15/088,811

(22) Filed: Apr. 1, 2016

(65) Prior Publication Data

US 2017/0285576 A1    Oct. 5, 2017

(51) Int. Cl.
| | | |
|---|---|---|
| G04B 47/00 | (2006.01) | |
| G04G 11/00 | (2006.01) | |
| G04G 13/02 | (2006.01) | |
| G01P 13/00 | (2006.01) | |
| G06F 13/42 | (2006.01) | |

(52) U.S. Cl.
CPC .............. *G04G 11/00* (2013.01); *G01P 13/00* (2013.01); *G04B 47/00* (2013.01); *G04G 13/02* (2013.01); *G06F 13/4282* (2013.01)

(58) Field of Classification Search
CPC ........ G04B 47/00; G04C 17/00; G04G 11/00; G04G 13/02; G04G 21/08; G04G 99/00; G01P 13/00; G06F 13/4282
See application file for complete search history.

(56) References Cited

U.S. PATENT DOCUMENTS

| | | | |
|---|---|---|---|
| 5,524,101 A | 6/1996 | Thorgersen et al. | |
| 7,506,035 B1 * | 3/2009 | Lu | ................... G04G 15/006 368/10 |
| 8,285,256 B2 | 10/2012 | Gupta et al. | |
| 8,320,971 B2 | 11/2012 | Roberts et al. | |
| 8,593,912 B1 | 11/2013 | Amores | |
| 2005/0101343 A1* | 5/2005 | Hsiao | ............. H04M 1/72522 455/550.1 |
| 2007/0243907 A1* | 10/2007 | Jin | ................ H04N 5/44513 455/566 |
| 2008/0112271 A1 | 5/2008 | Chan | |
| 2008/0130417 A1* | 6/2008 | Bhavnani | ............. G04G 9/0017 368/11 |
| 2008/0259742 A1* | 10/2008 | Tadanori | ............. G04G 13/021 368/263 |

(Continued)

FOREIGN PATENT DOCUMENTS

CN    103454899 A    12/2013

*Primary Examiner* — Vit W Miska
(74) *Attorney, Agent, or Firm* — Richard C. Litman

(57) ABSTRACT

The alarm clock having a motion sensor and mobile device connectivity is an alarm clock providing connectivity with a cellular telephone, smartphone or any similar suitable type of mobile device. The alarm clock having a motion sensor and mobile device connectivity includes an optical projector for projecting an image representative of a display screen of the mobile device on an external display surface, such as a wall or a ceiling. The alarm clock having a motion sensor and mobile device connectivity includes a housing for receiving a clock controller. A clock display, audio alarm, motion sensor, optical projector and a device interface are each mounted on the housing and are in communication with the clock controller. Actuation of the motion sensor by detected movement of a user's hand or the like selectively actuates the optical projector to project the image representative of the display screen of the mobile device.

1 Claim, 4 Drawing Sheets

(56) References Cited

U.S. PATENT DOCUMENTS

| | | |
|---|---|---|
| 2009/0181645 A1 | 7/2009 | Chan et al. |
| 2011/0267927 A1* | 11/2011 | Yamagami ............ G04G 13/028 368/10 |
| 2012/0242908 A1 | 9/2012 | Tsukagoshi |
| 2015/0177704 A1* | 6/2015 | Howell .................. G04G 13/02 368/10 |
| 2015/0254883 A1 | 9/2015 | Ignomirello |

* cited by examiner

US 9,836,029 B2

ALARM CLOCK HAVING A MOTION SENSOR AND MOBILE DEVICE CONNECTIVITY

BACKGROUND OF THE INVENTION

1. Field of the Invention

The present invention relates generally to alarm clocks, and particularly to an alarm clock having a motion sensor and mobile device connectivity.

2. Description of the Related Art

Given the popularity of smartphones, numerous household appliances have recently been adapted for interconnection with smartphones. For example, modern alarm clocks are often provided with connection ports or docks for connection to smartphones, allowing the alarm clock to be used for overnight charging of the smartphone while also allowing the smartphone to be used as a source of recorded music or the like to be played by the alarm clock.

With the processing power and memory of a typical smartphone, using such an interconnection with an alarm clock solely to play music clearly does not take advantage of the wide variety of resources and options available to the user. Thus, an alarm clock having a motion sensor and mobile device connectivity addressing the aforementioned problems is desired.

SUMMARY OF THE INVENTION

The alarm clock having a motion sensor and mobile device connectivity is an alarm clock providing connectivity with a cellular telephone, smartphone or any similar suitable type of mobile device. The alarm clock having a motion sensor and mobile device connectivity includes an optical projector for projecting an image representative of a display screen of the mobile device on an external display surface, such as a wall or a ceiling.

The alarm clock having a motion sensor and mobile device connectivity includes a housing for receiving a clock controller. A clock display, audio alarm, motion sensor, optical projector and a device interface are each mounted on the housing and are in communication with the clock controller. Actuation of the motion sensor by detected movement of a user's hand or the like selectively actuates the optical projector to project the image representative of the display screen of the mobile device.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
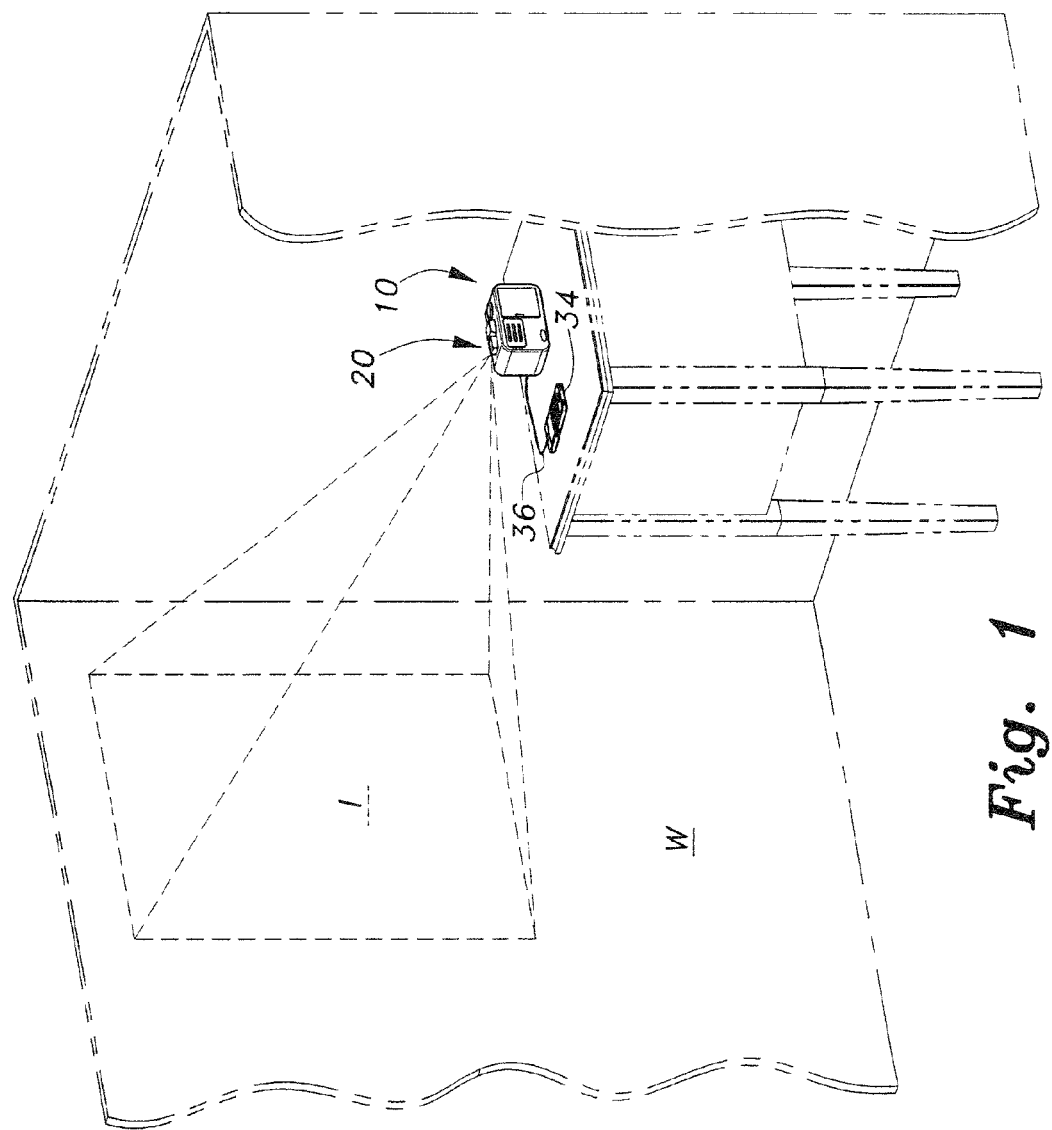
FIG. 1 is an environmental perspective view of an alarm clock having a motion sensor and mobile device connectivity according to the present invention.

The alarm clock having a motion sensor and mobile device connectivity 10 is an alarm clock providing connectivity with a cellular telephone, smartphone or any similar suitable type of mobile device 34. The alarm clock having a motion sensor and mobile device connectivity 10 includes an optical projector 20 for projecting an image I representative of a display screen of the mobile device 34 on an external display surface, such as wall W, a ceiling or the like. In FIG. 1, it should be understood that mobile device 34, image I and the choice of wall W are each shown for exemplary purposes only, and that any suitable type of mobile device 34 may be utilized and that any suitable display surface may be chosen for image I. Further, as will be discussed in greater detail below, the alarm clock a motion sensor and mobile device connectivity 10 may either connect with mobile device 34 through a cable 36 and a wired interface port, such as a universal serial bus (USB) port or the like, or device interface port 24 may alternatively be wireless, using any suitable type of wireless standard, such as Wi-Fi, Bluetooth or the like.

Figure 2:
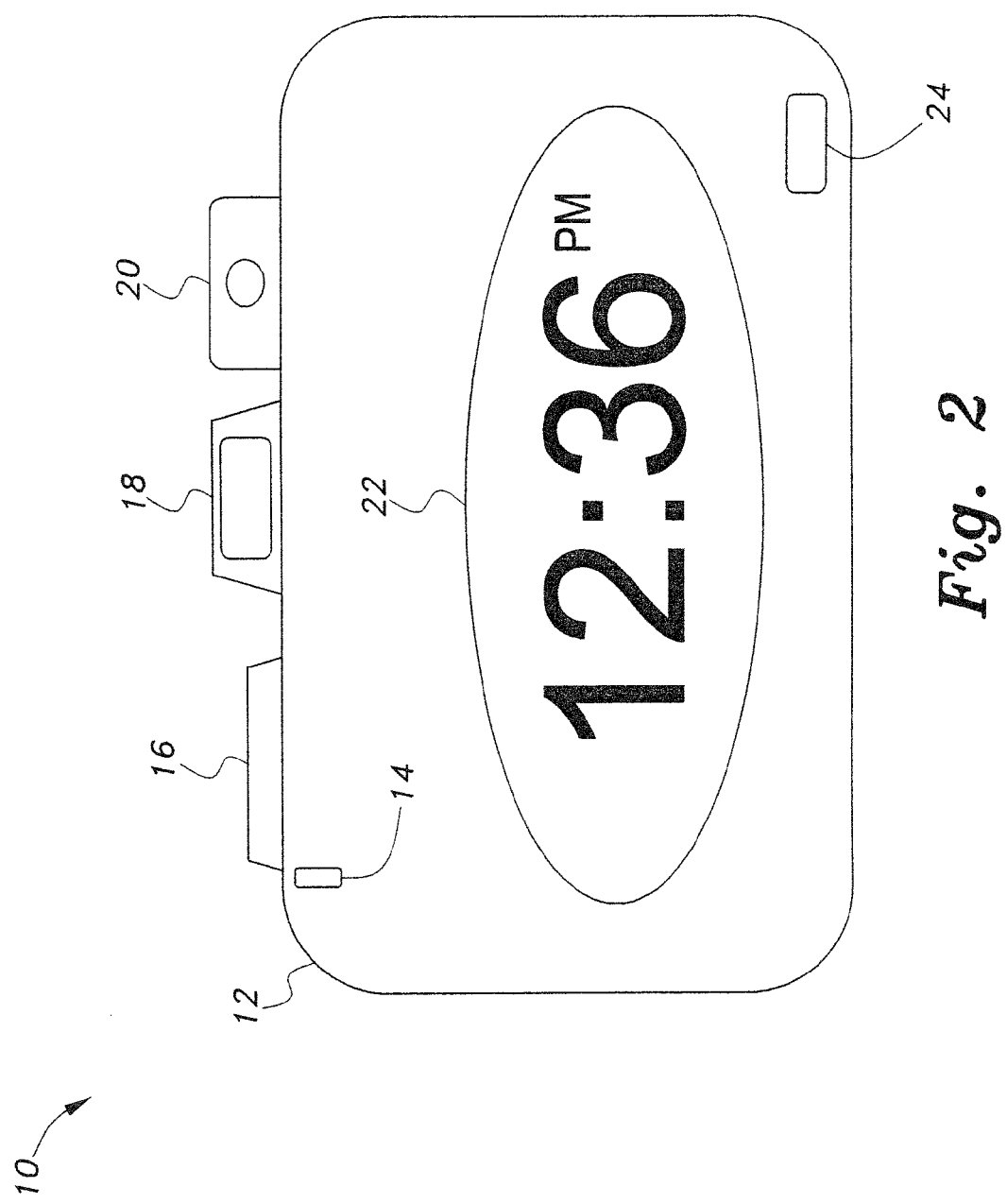
FIG. 2 is a front view of the alarm clock having a motion sensor and mobile device connectivity according to the present invention.
Figure 3:
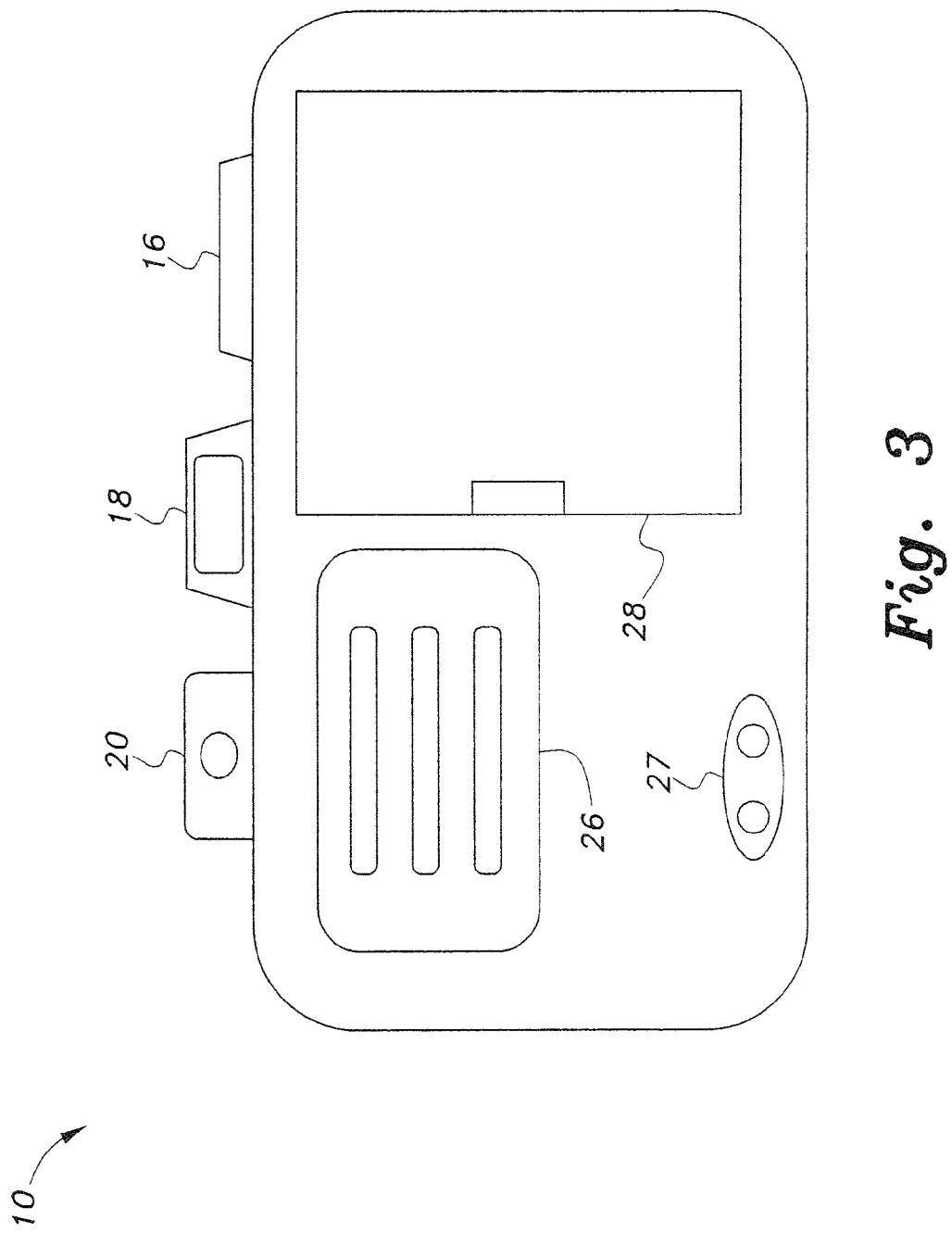
FIG. 3 is a rear view of the alarm clock having a motion sensor and mobile device connectivity according to the present invention.
Figure 4:
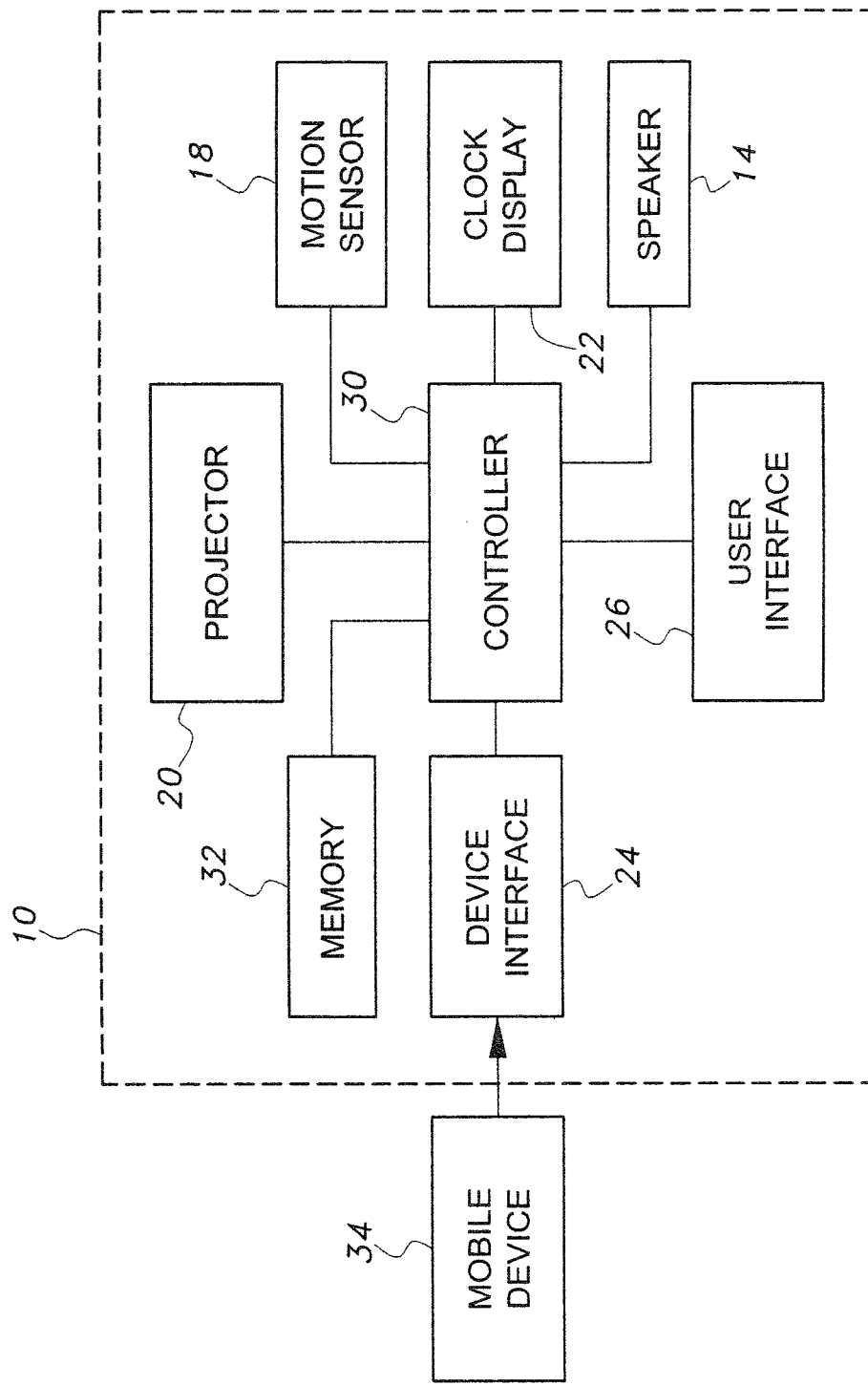
FIG. 4 is a block diagram showing system components of the alarm clock having a motion sensor and mobile device connectivity according to the present invention.

As shown in FIGS. 2 and 4, the alarm clock having a motion sensor and mobile device connectivity 10 includes a housing 12 for receiving a clock controller 30. It should be understood that the overall contouring, size and configuration of the alarm clock having a motion sensor and mobile device connectivity 10 as shown in FIGS. 1-3 are shown for exemplary purposes only, and that the alarm clock having a motion sensor and mobile device connectivity 10 may have any desired contouring, relative dimensions, overall configuration and ornamental appearance. It should be further understood that clock controller 30 may be any suitable type of controller, control circuit, processor, programmable logic controller or the like, including any suitable computer readable memory 32 and communication bus, as is well known in the art.

A clock display 22, audio alarm 14, motion sensor 18, optical projector 20 and a device interface 24 are each mounted on the housing 12 and are in communication with the clock controller 30. The clock display 22 is shown for exemplary purposes only, and it should be understood that clock display 22 may be any suitable type of liquid crystal display (LCD), light emitting diode (LED) display or the like, as is well known in the field of alarm clocks. Similarly, it should be understood that audio alarm 14 may be any suitable type of audio alarm, such as a conventional speaker, under the control of controller 30, as is well known in the field of alarm clocks. It should be further understood that motion sensor 18 may be any suitable type of motion sensor, such as an optical sensor, acoustic sensor or the like for sensing a motion made by the user's body, such as a hand wave or the like. Further, it should be understood that optical projector 20 may be any suitable type of projector, including any necessary optical components, for projecting image I on the display surface.

Additional components typically associated with a conventional alarm clock are also preferably provided, such as a snooze button 16 and, as shown in FIG. 3, a user interface 26 in the form of a control panel having buttons or the like for programming conventional alarm clock features, such as setting the time, programming an alarm time, controlling the speaker volume and the like. It should be understood that snooze button 16 and user interface 26 function in a conventional manner, as is well known in the field of alarm clocks.

The user interface 26 may also be used for programming or accessing functions associated with the mobile device 34. It should be understood that any suitable type of power source may be used to power the alarm clock having a motion sensor and mobile device connectivity 10, such as a conventional power connector 27 for connection to a conventional external electrical power supply, or via an on-board power supply contained within battery compartment 28.

Actuation of the motion sensor 18 by detected movement of the user's hand or the like selectively actuates the optical projector 20 to project the image I representative of the display screen of the mobile device 34. If the mobile device 34 is not connected to device interface 24, the optical projector 20 may be used for projecting a time display on wall W. In use, with a conventional smartphone or similar device, the initial image I would typically be the device's "lock screen"; i.e., the initial screen shown when mobile device 34 "wakes up" or is turned on. It should be understood that the user may use the mobile device 34 while it is interfaced with the alarm clock having a motion sensor and mobile device connectivity 10 and that the display screen of mobile device 34 will be mirrored in the image I projected by optical projector 20.

It should be understood that the conventional alarm clock components of the alarm clock having a motion sensor and mobile device connectivity 10 may be used in combination with the mobile device 34. For example, the clock display 22 may be used not only to display the time, but also provide an indication of connectivity status with mobile device 34. As a further example, the speaker 14 may be used in combination with audio features of mobile device 34. Further, it should be understood that when device interface 24 is a wired connection, device interface 24 may also be used as a source of recharging power for mobile device 34, as is conventionally known in USB connected devices.

It should be further understood that the mobile device 34 may be provided with any necessary software or program applications necessary for establishing and authorizing a connection protocol between mobile device 34 and controller 30. Such software may also be used for controlling features such as device charging and the like.

It is to be understood that the present invention is not limited to the embodiments described above, but encompasses any and all embodiments within the scope of the following claims.

I claim:

1. An alarm clock and mobile device combination, the combination comprising:
the alarm clock consisting of:
a housing;
a clock controller received within the housing;
a clock display mounted on the housing and being in communication with the clock controller, wherein the clock display includes a further display of the connectivity status of the mobile device;
an audio alarm mounted on the housing and being in communication with the clock controller;
a motion sensor mounted on the housing and being in communication with the clock controller;
an optical projector mounted on the housing and being in communication with the clock controller; and
an interface mounted on the housing and being in communication with the clock controller,
wherein the interface includes a wireless adaptor; and
the mobile device having means for communications, including:
a display screen;
a wireless interface for wirelessly connecting with the interface of the clock;
means for establishing and authorizing a connection protocol between the mobile device and the controller;
wherein the means for establishing and authorizing includes means for controlling features; and
wherein the motion sensor of the clock selectively actuating the optical projector to project an image mirroring the touchscreen display of the mobile device on an external display surface.

\* \* \* \* \*